(12) United States Patent
Jeddeloh

(10) Patent No.: US 7,216,196 B2
(45) Date of Patent: May 8, 2007

(54) MEMORY HUB AND METHOD FOR MEMORY SYSTEM PERFORMANCE MONITORING

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 330 days.

(21) Appl. No.: 10/747,984

(22) Filed: Dec. 29, 2003

(65) Prior Publication Data

US 2005/0144403 A1 Jun. 30, 2005

(51) Int. Cl.
*G06F 12/00* (2006.01)
(52) U.S. Cl. .......................................... 711/5; 711/105
(58) Field of Classification Search ....................... None
See application file for complete search history.

(56) References Cited

U.S. PATENT DOCUMENTS

| | | | |
|---|---|---|---|
| 4,084,225 A * | 4/1978 | Anderson et al. ............ 711/206 |
| 4,953,930 A | 9/1990 | Ramsey et al. ........... 350/96.11 |
| 5,251,303 A | 10/1993 | Fogg, Jr. et al. ............. 395/275 |
| 5,274,584 A * | 12/1993 | Henderson et al. ............ 365/64 |
| 5,432,907 A | 7/1995 | Picazo, Jr. et al. ........... 395/200 |
| 5,442,770 A | 8/1995 | Barratt ........................ 395/403 |
| 5,450,578 A | 9/1995 | Mackenthun ........... 395/182.02 |
| 5,497,476 A | 3/1996 | Oldfield et al. .............. 395/439 |
| 5,544,319 A | 8/1996 | Acton et al. ............ 395/200.07 |
| 5,572,722 A | 11/1996 | Vogley ........................ 395/555 |
| 5,619,676 A * | 4/1997 | Fukuda et al. ............... 711/137 |
| 5,621,739 A | 4/1997 | Sine et al. ................... 371/22.1 |
| 5,659,798 A | 8/1997 | Blumrich et al. ............ 395/846 |
| 5,790,048 A | 8/1998 | Hsieh et al. ............ 340/825.79 |
| 5,793,776 A | 8/1998 | Qureshi et al. ............. 371/22.1 |
| 5,818,844 A | 10/1998 | Singh et al. ................. 370/463 |
| 5,822,255 A | 10/1998 | Uchida ....................... 365/194 |
| 5,875,352 A | 2/1999 | Gentry et al. ............... 395/843 |
| 5,875,454 A | 2/1999 | Craft et al. .................. 711/113 |
| 5,905,858 A | 5/1999 | Jeddeloh ................ 395/185.05 |
| 5,912,852 A | 6/1999 | Lawrence et al. ........... 365/201 |
| 5,914,902 A | 6/1999 | Lawrence et al. ........... 365/201 |
| 5,959,914 A | 9/1999 | Gates et al. ................. 365/201 |
| 6,033,951 A | 3/2000 | Chao .......................... 438/253 |
| 6,061,263 A | 5/2000 | Boaz et al. ..................... 365/51 |
| 6,067,262 A | 5/2000 | Irrinki et al. ................ 365/201 |
| 6,073,190 A | 6/2000 | Rooney ........................ 710/56 |
| 6,079,008 A | 6/2000 | Clery, III ...................... 712/11 |
| 6,105,075 A | 8/2000 | Ghaffari ......................... 710/5 |

(Continued)

OTHER PUBLICATIONS

Micron Technology, Inc., Synchronous DRAM Module 512MB/ 1GB (x72, ECC) 168-PIN Registered FBGA SDRAM DIMM, Micron Technology, Inc., 2002, pp. 1-23.

(Continued)

*Primary Examiner*—Brian R. Peugh
(74) *Attorney, Agent, or Firm*—Dorsey & Whitney, LLP

(57) ABSTRACT

A memory module includes a memory hub coupled to several memory devices. The memory hub includes at least one performance counter that tracks one or more system metrics—for example, page hit rate, number or percentage of prefetch hits, cache hit rate or percentage, read rate, number of read requests, write rate, number of write requests, rate or percentage of memory bus utilization, local hub request rate or number, and/or remote hub request rate or number.

32 Claims, 3 Drawing Sheets

U.S. PATENT DOCUMENTS

| | | | |
|---|---|---|---|
| 6,137,709 A | 10/2000 | Boaz et al. | 365/51 |
| 6,144,587 A | 11/2000 | Yoshida | 365/189.05 |
| 6,167,465 A | 12/2000 | Parvin et al. | 710/22 |
| 6,167,486 A | 12/2000 | Lee et al. | 711/120 |
| 6,173,388 B1 | 1/2001 | Abercrombie et al. | 712/22 |
| 6,186,400 B1 | 2/2001 | Dvorkis et al. | 235/462.45 |
| 6,201,724 B1 | 3/2001 | Ishizaki et al. | 365/49 |
| 6,205,564 B1 | 3/2001 | Kim et al. | 714/48 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,256,692 B1 | 7/2001 | Yoda et al. | 710/104 |
| 6,272,609 B1 | 8/2001 | Jeddeloh | 711/169 |
| 6,285,349 B1 | 9/2001 | Smith | 345/147 |
| 6,301,637 B1 | 10/2001 | Krull et al. | 711/112 |
| 6,327,642 B1 | 12/2001 | Lee et al. | 711/120 |
| 6,330,205 B2 | 12/2001 | Shimizu et al. | 365/230.06 |
| 6,347,055 B1 | 2/2002 | Motomura | 365/189.05 |
| 6,349,363 B1 | 2/2002 | Cai et al. | 711/129 |
| 6,351,834 B1 | 2/2002 | Maekawa et al. | 714/718 |
| 6,356,573 B1 | 3/2002 | Jonsson et al. | 372/46 |
| 6,367,074 B1 | 4/2002 | Bates et al. | 717/11 |
| 6,373,777 B1 | 4/2002 | Suzuki | 365/230.03 |
| 6,381,190 B1 | 4/2002 | Shinkai | 365/230.03 |
| 6,392,653 B1 | 5/2002 | Malandain et al. | 345/501 |
| 6,421,744 B1 | 7/2002 | Morrison et al. | 710/22 |
| 6,434,639 B1 | 8/2002 | Haghighi | 710/39 |
| 6,438,668 B1 | 8/2002 | Esfahani et al. | 711/165 |
| 6,446,174 B1 | 9/2002 | Dow | 711/154 |
| 6,462,978 B2 | 10/2002 | Shibata et al. | 365/63 |
| 6,463,059 B1 | 10/2002 | Movshovich et al. | 370/389 |
| 6,470,422 B2 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |
| 6,487,648 B1 | 11/2002 | Hassoun | 711/167 |
| 6,493,803 B1 | 12/2002 | Pham et al. | 711/147 |
| 6,496,909 B1 | 12/2002 | Schimmel | 711/163 |
| 6,505,287 B2 | 1/2003 | Uematsu | 711/170 |
| 6,523,092 B1 | 2/2003 | Fanning | 711/134 |
| 6,523,093 B1 | 2/2003 | Bogin et al. | 711/137 |
| 6,539,490 B1 | 3/2003 | Forbes et al. | 713/401 |
| 6,552,564 B1 | 4/2003 | Forbes et al. | 326/30 |
| 6,587,912 B2 | 7/2003 | Leddige et al. | 711/5 |
| 6,590,816 B2 | 7/2003 | Perner | 365/200 |
| 6,594,713 B1 | 7/2003 | Fuoco et al. | 710/31 |
| 6,622,227 B2 | 9/2003 | Zumkehr et al. | 711/167 |
| 6,631,440 B2 | 10/2003 | Jenne et al. | 711/105 |
| 6,636,110 B1 | 10/2003 | Ooishi et al. | 327/565 |
| 6,675,117 B2 | 1/2004 | Adam et al. | 702/106 |
| 6,681,292 B2 | 1/2004 | Creta et al. | 711/119 |
| 6,732,203 B2 | 5/2004 | Kanapathippillai et al. | 710/66 |
| 6,782,465 B1 | 8/2004 | Schmidt | 711/208 |
| 6,832,306 B1 | 12/2004 | Ganapathy et al. | 712/41 |
| 6,880,117 B2 | 4/2005 | Lin et al. | 714/718 |
| 6,970,968 B1* | 11/2005 | Holman | 711/5 |
| 6,972,981 B2 | 12/2005 | Ruckerbauer et al. | 365/63 |
| 7,036,055 B2 | 4/2006 | Muljono et al. | 714/716 |
| 2001/0013110 A1 | 8/2001 | Pierce et al. | 714/718 |
| 2002/0023203 A1 | 2/2002 | Cofler et al. | 712/227 |
| 2002/0046379 A1 | 4/2002 | Miki et al. | 714/749 |
| 2002/0066052 A1 | 5/2002 | Olarig et al. | 714/42 |
| 2002/0089925 A1 | 7/2002 | Smith et al. | 370/216 |
| 2002/0112119 A1 | 8/2002 | Halbert et al. | 711/115 |
| 2002/0144064 A1 | 10/2002 | Fanning | 711/144 |
| 2002/0194558 A1 | 12/2002 | Wang et al. | 714/718 |
| 2002/0199136 A1 | 12/2002 | Ku | 714/30 |
| 2002/0199139 A1 | 12/2002 | Dortu et al. | 714/718 |
| 2003/0005223 A1 | 1/2003 | Coulson et al. | 711/118 |
| 2003/0043426 A1 | 3/2003 | Baker et al. | 359/109 |
| 2003/0046628 A1 | 3/2003 | Rankin et al. | 714/752 |
| 2003/0056038 A1* | 3/2003 | Cochran | 710/36 |
| 2003/0229770 A1 | 12/2003 | Jeddeloh | 711/213 |
| 2004/0123043 A1* | 6/2004 | Rotithor et al. | 711/137 |
| 2004/0123180 A1* | 6/2004 | Soejima et al. | 714/5 |
| 2004/0128433 A1* | 7/2004 | Bains | 711/106 |
| 2004/0216018 A1 | 10/2004 | Cheung | 714/724 |
| 2004/0237001 A1 | 11/2004 | Schulz et al. | 714/42 |
| 2005/0021884 A1 | 1/2005 | Jeddeloh | 710/22 |
| 2005/0283681 A1 | 12/2005 | Jeddeloh | 714/42 |
| 2006/0075282 A1 | 4/2006 | Borkenhagen et al. | 714/5 |

OTHER PUBLICATIONS

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

Applicant also wishes to make known to the Patent and Trademark Office that an application, U.S. Appl. No. 10/822,275, describing and claiming subject matter that is similar to the subject matter of this application, was filed Apr. 8, 2004. This releted application, as well as any prior art cited therein, may be material to the examination of this application, A copy of this related application as filed is submitted herewith in accordance with 37 C.F.R. § 1.98(d).

Applicant also wishes to make known to the Patent and Trademark Office that an application, U.S. Appl. No. 10/773,583, describing and claiming subject matter that is similar to the subject matter of this application, was filed Feb. 5, 2004. The related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/645,288, describing and claiming subject matter that is similar to the subject matter of this application, was filed Aug. 20, 2003. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/747,917, describing and claiming subject matter that is similar to the subject matter of this application, was filed Dec. 29, 2003. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/821,950, describing and claiming subject matter that is similar to the subject matter of this application, was filed Mar. 29, 2004. This related application, as well as any prior art cited therein, may be material to the examination of this application. A copy of this related applications as filed is submitted herewith in accordance with 37 C.F.R. § 1.98(d).

Applicant also wishes to make known to the Patent and Trademark Office that an application, U.S. Appl. No. 10/773,520, describing and claiming subject matter that is similar to the subject matter of this application, was filed Feb. 5, 2004. This related application, as well as any prior art cited therein, may be material to the examination of this application. A copy of this related application as filed is submitted herewith in accordance with C.F.R. § 1.98(d).

Applicant also wishes to make known to the Patent and Trademark Office that an application, U.S. Appl. No. 10/797,727, describing and claiming subject matter that is similar to the subject matter of this application, was filed Mar. 8, 2004. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/809,839, describing and claiming subject matter that is similar to the subject matter of this application, was filed Mar. 24, 2004. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 11/819,366, describing and claiming subject matter that is similar to the subject matter of this application, was filed Apr. 5, 2004. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/810,229, describing and claiming subject matter that is similar to the subject matter of this application, was filed Mar. 25, 2004. This related application, as well as any prior art cited therein, may be material to the examination of this application. A copy of this related application as filed is submitted herewith in accordance with 37 C.F.R. § 1.98(d).

Applicant also wishes to make known to the Patent and Trademakr Office that an application, U.S. Appl. No. 09/994,516, describing and claiming subject matter that is similar to the subject matter of this application, was filed Nov. 26, 2001. The related application, as well as any prior art cited therein, may be material to the examination of this application. A copy of this related application as filed is submitted herewith in accordance with with 37 C.F.R. § 1.98(d).

Applicant also wishes to make known to the Patent and Trademark Office that an application, U.S. Appl. No. 10/165,787, describing and claiming subject matter that is similar to the subject matter of this application, was filed Jun. 7, 2002. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/215,505, describing and claiming subject matter that is similar to the subject matter of this application, was filed Aug. 9, 2002. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/211,036, describing and claiming subject matter that is similar to the subject matter of this application, was filed Aug. 2, 2002. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/601,222, desribing and claiming subject matter that is similar to the subject matter of this application, was filed Jun. 20, 2003. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/213,038, describing and claiming subject matter that is similar to the subject matter of this application, was filed Aug. 5, 2002. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/601,104, describing and claiming subject matter that is similar to the subject matter of this application, was filed Jun. 19, 2003. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/238,322, describing and claiming subject matter that is similar to the subject matter of this application, was filed Sep. 9, 2002. This related application, as well as any prior art cited therein, may be material to the examination of this application. A copy of this application as filed is submitted herewith in accordance with 37 C.F.R. § 1.98(d).

Applicant also wishes to make known to the Patent and Trademark Office that an application, U.S. Appl. No. 10/232,842, describing and claiming subject matter that is similar to the subject matter of this application, was filed Aug. 29, 2002. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/601,253, describing and claiming subject matter that is similar to the subject matter of this application, was filed Jun. 20, 2003. This related application, was well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/232,473, describing and claiming subject matter that is similar to the subject matter of this application, was filed Aug. 29, 2002. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/601,252, describing and claiming subject matter that is similar to the subject matter of this application, was filed Jun. 20, 2003. This related application, was well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/222,415, describing and claiming subject matter that is similar to the subject matter of this application, was filed Aug. 16, 2002. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/222,393, describing and claiming subject matter that is similar to the subject matter of this application, was filed Aug. 16, 2002. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/690,810, describing and claiming subject matter that is similar to the subject matter of this application, was filed Oct. 20, 2003. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/644,522, describing and claiming subject matter that is similar to the subject matter of this application, was filed Aug. 19, 2003. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/660,844, describing and claiming subject matter that is similar to the subject matter of this application, was filed Sep. 12, 2003. This related application, as well as any prior art cited therein, may be material to the examination of this application. A copy of this related application as filed as submitted herewith in accordance with 37 C.F.R. § 1.98(d).

Applicant also wishes to make known to the Patent and Trademark Office that an application, U.S. Appl. No. 10/651,801, describing and claiming subject matter that is similar to the subject matter of this application, was filed Aug. 28, 2003. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/665,904, describing and claiming subject matter that is similar to the subject matter of this application, was filed Sep. 18, 2003. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/653,044, describing and claiming subject matter that is similar to the subject matter of this application, was filed Aug. 28, 2003. This related application, as well as any prior art cited therein, may be material to the examination of this application. A copy of this related application as filed is submitted herewith in accordance with 37 C.F.R. § 1.98(d).

Applicant also wishes to make known the the Patent and Trademark Office that an application, U.S. Appl. No. 10/695,383, describing and claiming subject matter that is similar to the subject matter of this application, was filed Oct. 27, 2003. This related application, as well as any prior art cited therein, may be material to the examination of this application. A copy of this related application as filed is submitted herewith in accordance with 37 C.F.R. § 1.98(d).

Applicant also wishes to make known to the Patent and Trademark Office that an application, U.S. Appl. No. 10/460,588, describing and claiming subject matter that is similar to the subject matter of this application, was filed Jun. 11, 2003. This related application, as well as any prior art cited therein, may be material to the examination of this application. A copy of this related application as filed is submitted herewith in accordance with 37 C.F.R. § 1.98(d).

* cited by examiner

MEMORY HUB AND METHOD FOR MEMORY SYSTEM PERFORMANCE MONITORING

TECHNICAL FIELD

This invention relates to computer systems, and, more particularly, to a computer system having a memory hub coupling several memory devices to a processor or other memory access device.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a system controller or memory controller is coupled to several memory modules, each of which includes a memory hub coupled to several memory devices. The memory hub efficiently routes memory requests and responses between the controller and the memory devices. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor.

Although computer systems using memory hubs may provide superior performance, they nevertheless often fail to operate at optimum speed for several reasons. For example, even though memory hubs can provide computer systems with a greater memory bandwidth, they still suffer from latency problems of the type described above. More specifically, although the processor may communicate with one memory device while another memory device is preparing to transfer data, it is sometimes necessary to receive data from one memory device before the data from another memory device can be used. In the event data must be received from one memory device before data received from another memory device can be used, the latency problem continues to slow the operating speed of such computer systems.

One technique that has been used to reduce latency in memory devices is to prefetch data, i.e., read data from system memory before the data are requested by a program being executed. Generally the data that are to be prefetched are selected based on a pattern of previously fetched data. The pattern may be as simple as a sequence of addresses from which data are fetched so that data can be fetched from subsequent addresses in the sequence before the data are needed by the program being executed. The pattern, which is known as a "stride," may, of course, be more complex.

Further, even though memory hubs can provide computer systems with a greater memory bandwidth, they still suffer from throughput problems. For example, before data can be read from a particular row of memory cells, digit lines in the array are typically precharged by equilibrating the digit lines in the array. The particular row is then opened by coupling the memory cells in the row to a digit line in respective columns. A respective sense amplifier coupled between the digit lines in each column then responds to a change in voltage corresponding to the data stored in respective memory cell. Once the row has been opened, data can be coupled from each column of the open row by coupling the digit lines to a data read path. Opening a row, also referred to as a page, therefore consumes a finite amount of time and places a limit on the memory throughput.

Finally, the optimal decision of whether or not to prefetch data (and which data to prefetch), as well as whether or not to precharge or open a row, and whether or not to cache accessed data, may change over time and vary as a function of an application being executed by a processor that is coupled to the memory hub.

Another potential problem with memory hub architectures relates to the use of a memory hub as a conduit for coupling memory requests and data through the memory hub to and from downstream memory modules. If the memory requests and data are not efficiently routed through the memory hub, the memory bandwidth of a memory system employing memory hubs can be severely limited.

All of the above-described issues can be addressed to some extent by configuring the memory module, including a memory hub mounted in the module, in different respects. However, before the configuration of the memory module can be optimized, it is necessary or desirable to analyze the performance of the memory hub so the areas in which performance is lacking can be determined. However, suitable techniques to analyze the ongoing performance of memory systems used in processor-based system have not been developed.

There is therefore a need for a computer architecture that provides the advantages of a memory hub architecture that can also allow the performance of a memory system using the memory hub architecture to be determined so that the configuration of the system could be optimized.

DETAILED DESCRIPTION OF THE INVENTION

Figure 1:
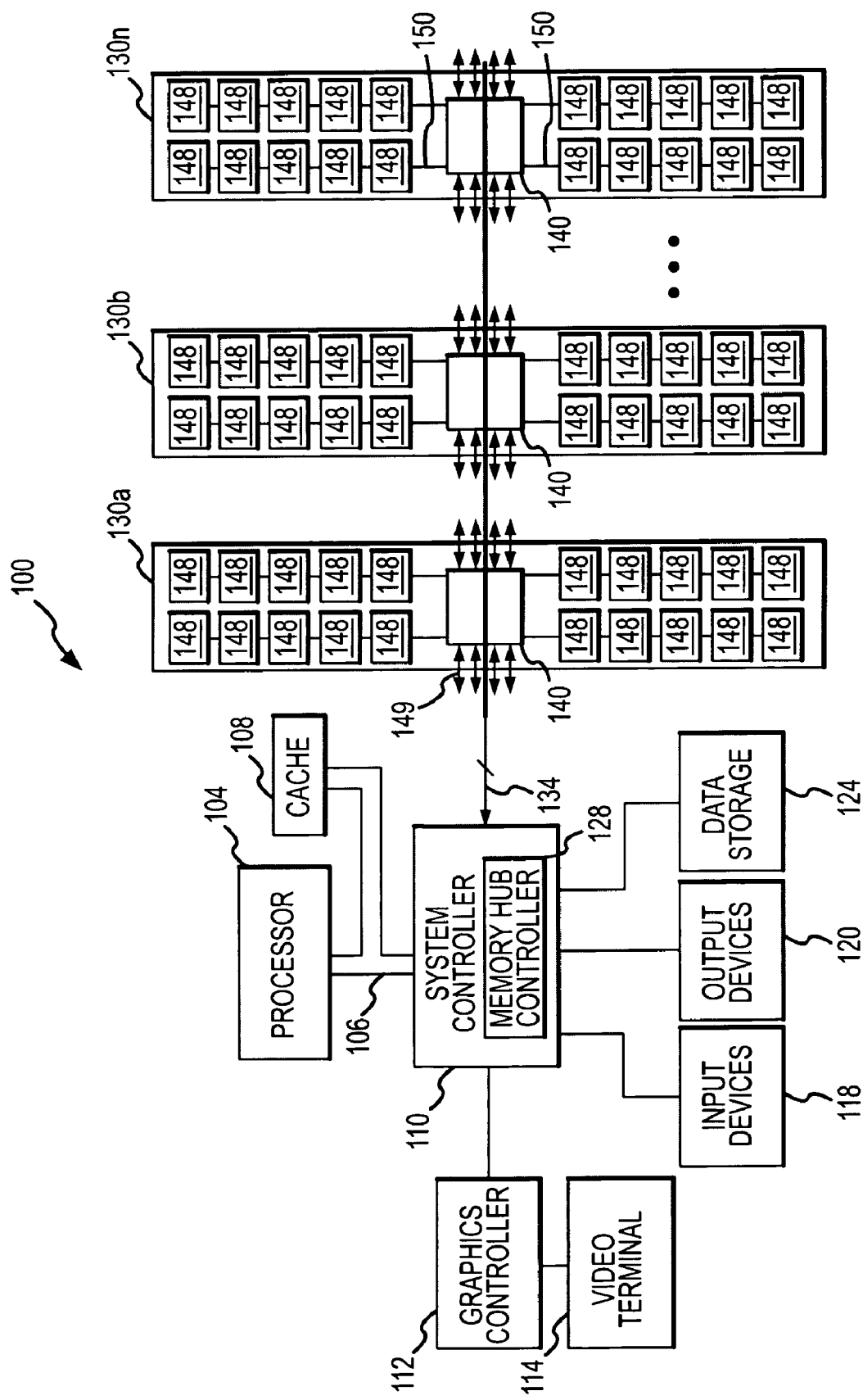
FIG. 1 is a block diagram of a computer system according to one example of the invention in which a memory hub is included in each of a plurality of memory modules.

A computer system 100 according to one example of the invention is shown in FIG. 1. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 is coupled to several memory modules 130a,b . . . n, which serve as system memory for the computer system 100. The memory modules 130 are preferably coupled to the system controller 110 through a high-speed link 134, which may be an optical or electrical communication path or some other type of communications path. In the event the high-speed link 134 is implemented as an optical communication path, the optical communication path may be in the form of one or more optical fibers, for example. In such case, the system controller 110 and the memory modules will include an optical input/output port or separate input and output ports coupled to the optical communication path. The memory modules 130 are shown coupled to the system controller 110 in a point-to-point arrangement in which each segment of the high-speed link 134 is coupled between only two points. Therefore, all but the final memory module 130n is used as a conduit for memory requests and data coupled to and from downstream memory modules 130. However, it will be understood that other topologies may also be used. A switching topology may also be used in which the system controller 110 is selectively coupled to each of the memory modules 130 through a switch (not shown). Other topologies that may be used will be apparent to one skilled in the art.

Each of the memory modules 130 includes a memory hub 140 for controlling access to 32 memory devices 148, which, in the example illustrated in FIG. 1, are synchronous dynamic random access memory ("SDRAM") devices. The memory hub 140 in all but the final memory module 130 also acts as a conduit for coupling memory commands to downstream memory hubs 140 and data to and from downstream memory hubs 140. However, a fewer or greater number of memory devices 148 may be used, and memory devices other than SDRAM devices may, of course, also be used. In the example illustrated in FIG. 1, the memory hubs 140 communicate over 4 independent memory channels 149 over the high-speed link 134. In this example, although not shown in FIG. 1, 4 memory hub controllers 128 are provided, each to receive data from one memory channel 149. A fewer or greater number of memory channels 149 may be used, however, in other examples. The memory hub 140 is coupled to each of the system memory devices 148 through a bus system 150, which normally includes a control bus, an address bus and a data bus.

Figure 2:
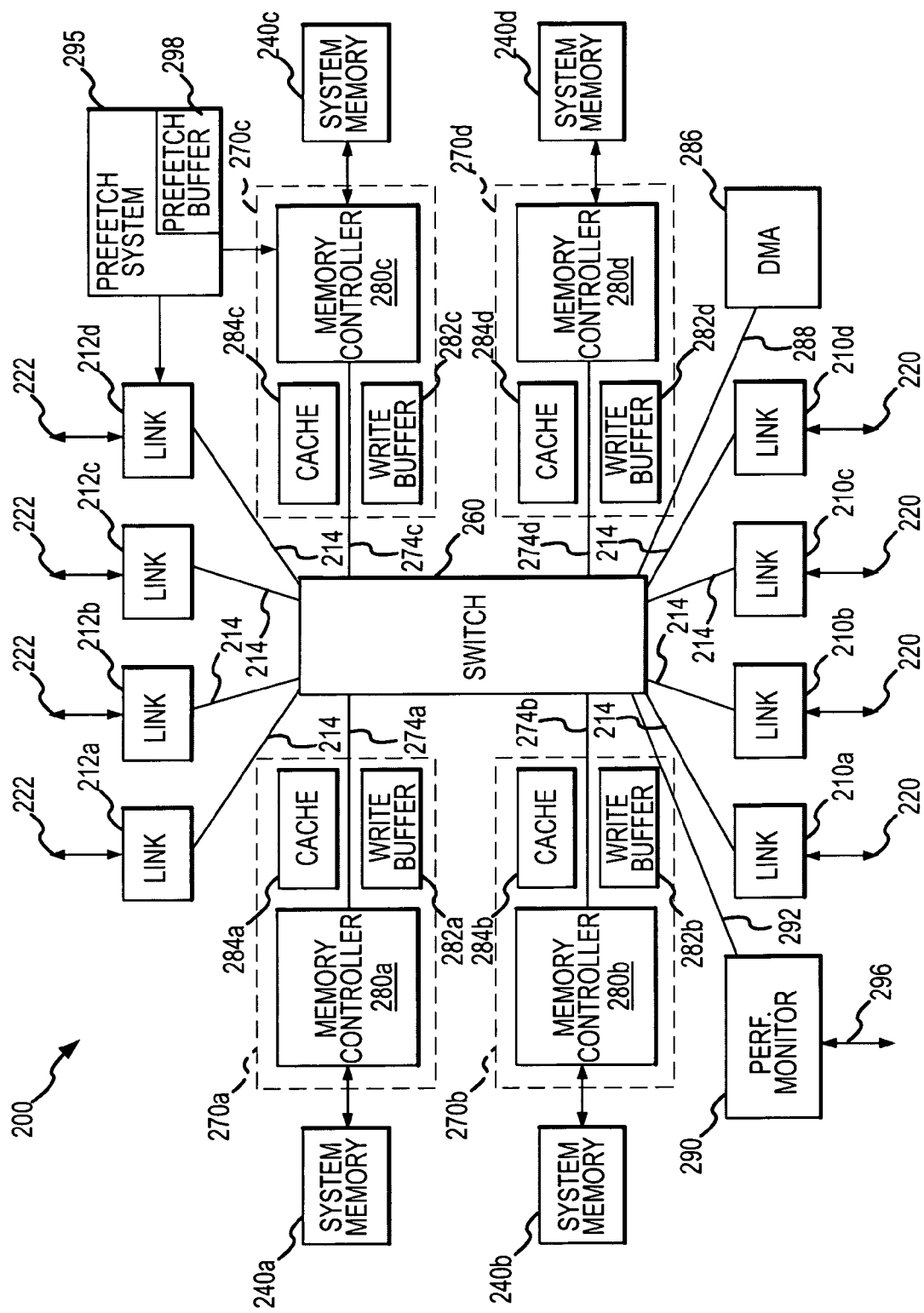
FIG. 2 is a block diagram of a memory hub used in the computer system of FIG. 1, which contains a performance monitor according to one example of the invention.

A memory hub 200 according to an embodiment of the present invention is shown in FIG. 2. The memory hub 200 can be substituted for the memory hub 140 of FIG. 1. The memory hub 200 is shown in FIG. 2 as being coupled to four memory devices 240a–d, which, in the present example are conventional SDRAM devices. In an alternative embodiment, the memory hub 200 is coupled to four different banks of memory devices, rather than merely four different memory devices 240a–d, with each bank typically having a plurality of memory devices. However, for the purpose of providing an example, the present description will be with reference to the memory hub 200 coupled to the four memory devices 240a–d. It will be appreciated that the necessary modifications to the memory hub 200 to accommodate multiple banks of memory is within the knowledge of those ordinarily skilled in the art.

Further included in the memory hub 200 are link interfaces 210a–d and 212a–d for coupling the memory module on which the memory hub 200 is located to a first high speed data link 220 and a second high speed data link 222, respectively. The link interfaces 210a–d and 212a–d allow the memory hub 200 to be used as a conduit for memory requests and data to and from downstream memory modules 130. As previously discussed with respect to FIG. 1, the high speed data links 220, 222 can be implemented using an optical or electrical communication path or some other type of communication path. The link interfaces 210a–d, 212a–d are conventional, and include circuitry used for transferring data, command, and address information to and from the high speed data links 220, 222. As is well known, such circuitry includes transmitter and receiver logic known in the art. It will be appreciated that those ordinarily skilled in the art have sufficient understanding to modify the link interfaces 210a–d, 212a–d to be used with specific types of communication paths, and that such modifications to the link interfaces 210a–d, 212a–d can be made without departing from the scope of the present invention. For example, in the event the high-speed data link 220, 222 is implemented using an optical communications path, the link interfaces 210a–d, 212a–d will include an optical input/output port that can convert optical signals coupled through the optical communications path into electrical signals.

The link interfaces 210a–d, 212a–d are coupled to a switch 260 through a plurality of bus and signal lines, represented by busses 214. The busses 214 are conventional, and include a write data bus and a read data bus, although a single bi-directional data bus may alternatively be provided to couple data in both directions through the link interfaces 210a–d, 212a–d. It will be appreciated by those ordinarily skilled in the art that the busses 214 are provided by way of example, and that the busses 214 may include fewer or greater signal lines, such as further including a request line and a snoop line, which can be used for maintaining cache coherency.

The link interfaces 210a–d, 212a–d include circuitry that allow the memory hub 200 to be connected in the system memory in a point-to-point configuration, as previously explained. This type of interconnection provides better signal coupling between the processor 104 and the memory hub 200 for several reasons, including relatively low capacitance, relatively few line discontinuities to reflect signals and relatively short signal paths. However, the link interfaces 210a–d and 212a–d could also be used to allow coupling to the memory hubs 200 in a variety of other configurations.

The switch 260 is further coupled to four memory interfaces 270a–d which are, in turn, coupled to the system memory devices 240a–d, respectively. By providing a separate and independent memory interface 270a–d for each system memory device 240a–d, respectively, the memory hub 200 avoids bus or memory bank conflicts that typically occur with single channel memory architectures. The switch 260 is coupled to each memory interface through a plurality of bus and signal lines, represented by busses 274. The busses 274 include a write data bus, a read data bus, and a request line. However, it will be understood that a single bi-directional data bus may alternatively be used instead of a separate write data bus and read data bus. Moreover, the busses 274 can include a greater or lesser number of signal lines than those previously described.

In an embodiment of the present invention, each memory interface 270a–d is specially adapted to the system memory devices 240a–d to which it is coupled. More specifically, each memory interface 270a–d is specially adapted to provide and receive the specific signals received and generated, respectively, by the system memory device 240a–d to which it is coupled. Also, the memory interfaces 270a–d are capable of operating with system memory devices 240a–d operating at different clock frequencies. As a result, the memory interfaces 270a–d isolate the processor 104 from changes that may occur at the interface between the memory hub 200 and memory devices 240a–d coupled to the memory hub 200, and it provides a more controlled environment to which the memory devices 240a–d may interface.

The switch 260 coupling the link interfaces 210a–d, 212a–d and the memory interfaces 270a–d can be any of a variety of conventional or hereinafter developed switches. For example, the switch 260 may be a cross-bar switch that can simultaneously couple link interfaces 210a–d, 212a–d and the memory interfaces 270a–d to each other in a variety of arrangements. The switch 260 can also be a set of multiplexers that do not provide the same level of connectivity as a cross-bar switch but nevertheless can couple the some or all of the link interfaces 210a–d, 212a–d to each of the memory interfaces 270a–d. The switch 260 may also include arbitration logic (not shown) to determine which memory accesses should receive priority over other memory accesses. Bus arbitration performing this function is well known to one skilled in the art.

With further reference to FIG. 2, each of the memory interfaces 270a–d includes a respective memory controller 280, a respective write buffer 282, and a respective cache memory unit 284. The memory controller 280 performs the same functions as a conventional memory controller by providing control, address and data signals to the system memory device 240a–d to which it is coupled and receiving data signals from the system memory device 240a–d to which it is coupled. The write buffer 282 and the cache memory unit 284 include the normal components of a buffer and cache memory, including a tag memory, a data memory, a comparator, and the like, as is well known in the art. The memory devices used in the write buffer 282 and the cache memory unit 284 may be either DRAM devices, static random access memory ("SRAM") devices, other types of memory devices, or a combination of all three. Furthermore, any or all of these memory devices as well as the other components used in the cache memory unit 284 may be either embedded or stand-alone devices.

The write buffer 282 in each memory interface 270a–d is used to store write requests while a read request is being serviced. In a such a system, the processor 104 can issue a write request to a system memory device 240a–d even if the memory device to which the write request is directed is busy servicing a prior write or read request. Using this approach, memory requests can be serviced out of order since an earlier write request can be stored in the write buffer 282 while a subsequent read request is being serviced. The ability to buffer write requests to allow a read request to be serviced can greatly reduce memory read latency since read requests can be given first priority regardless of their chronological order. For example, a series of write requests interspersed with read requests can be stored in the write buffer 282 to allow the read requests to be serviced in a pipelined manner followed by servicing the stored write requests in a pipelined manner. As a result, lengthy settling times between coupling write request to the memory devices 270a–d and subsequently coupling read request to the memory devices 270a–d for alternating write and read requests can be avoided.

The use of the cache memory unit 284 in each memory interface 270a–d allows the processor 104 to receive data responsive to a read command directed to a respective system memory device 240a–d without waiting for the memory device 240a–d to provide such data in the event that the data was recently read from or written to that memory device 240a–d. The cache memory unit 284 thus reduces the read latency of the system memory devices 240a–d to maximize the memory bandwidth of the computer system. Similarly, the processor 104 can store write data in the cache memory unit 284 and then perform other functions while the memory controller 280 in the same memory interface 270a–d transfers the write data from the cache memory unit 284 to the system memory device 240a–d to which it is coupled.

Further included in the memory hub 200 is a performance monitor 290 coupled to the switch 260 through a diagnostic bus 292. The performance monitor 290 monitors the performance of the memory hub 200 through the switch 260. For example, the performance monitor 290 can keep track of the number of cache hits, memory page hits or prefetch hit occurring in the memory hub 200. The performance monitor 290 can also monitor the coupling of memory requests and data through the memory hub 200 via the link interfaces 210a–d, 212a–d and the switch 260 to determine how busy the hub 200 is and whether it is coupling memory requests and data efficiently and without excessive delay. The performance monitor 290 is further coupled to a maintenance bus 296, such as a System Management Bus (SMBus) or a maintenance bus according to the Joint Test Action Group (JTAG) and IEEE 1149.1 standards. Both the SMBus and JTAG standards are well known by those ordinarily skilled in the art. Generally, the maintenance bus 296 provides a user access to the performance statistics tracked by the performance monitor 290. It will be appreciated that the maintenance bus 296 can be modified from conventional bus standards without departing from the scope of the present invention. It will be further appreciated that the performance statistics can be coupled from the performance monitor 290 by other means.

Further included in the memory hub 200 is a DMA engine 286 coupled to the switch 260 through a bus 288. The DMA engine 286 enables the memory hub 200 to move blocks of data from one location in the system memory to another location in the system memory without intervention from the processor 104. The bus 288 includes a plurality of conventional bus lines and signal lines, such as address, control, data busses, and the like, for handling data transfers in the system memory. Conventional DMA operations well known by those ordinarily skilled in the art can be implemented by the DMA engine 286. The DMA engine 286 is able to read a link list in the system memory to execute the DMA memory operations without processor intervention, thus, freeing the processor 104 and the bandwidth limited system bus from executing the memory operations. The DMA engine 286 can also include circuitry to accommodate DMA operations on multiple channels, for example, for each of the system memory devices 240a–d. Such multiple channel DMA engines are well known in the art and can be implemented using conventional technologies.

The performance monitor 290 is preferably an embedded circuit in the memory hub 200. However, including a separate performance monitor coupled to the memory hub 200 is also possible.

As described above, one approach to reducing latency in memory devices is to prefetch data. Accordingly, the memory hub 200 further includes a prefetch system 295 including a prefetch buffer 298. Briefly, the prefetch system 295 in the memory hub 200 anticipates which data will be needed during execution of a program, and then prefetches those data and stores them in one or more buffers, such as a prefetch buffer 298, that are part of the prefetch system 295. The prefetch system 295 includes several prefetch buffers, including the prefetch buffer 298, the number of which can be made variable depending upon operating conditions, as explained in the aforementioned patent application. Briefly, the prefetch buffers receive prefetched data from the memory device interface 270c in FIG. 2. The data are stored in the prefetch buffers so that they will be available for a subsequent memory access. The data are then coupled to the link interface 212d. Although one prefetch system is shown coupled to the memory device interface 270c and the link interface 212d in FIG. 2, it is to be understood that in some embodiments the prefetch system 295 may be coupled to a plurality of link interfaces and/or a plurality of memory device interfaces. Further, in some embodiments, a plurality of prefetch systems may be provided in communication with one or a plurality of link interfaces and/or memory device interfaces.

Figure 3:
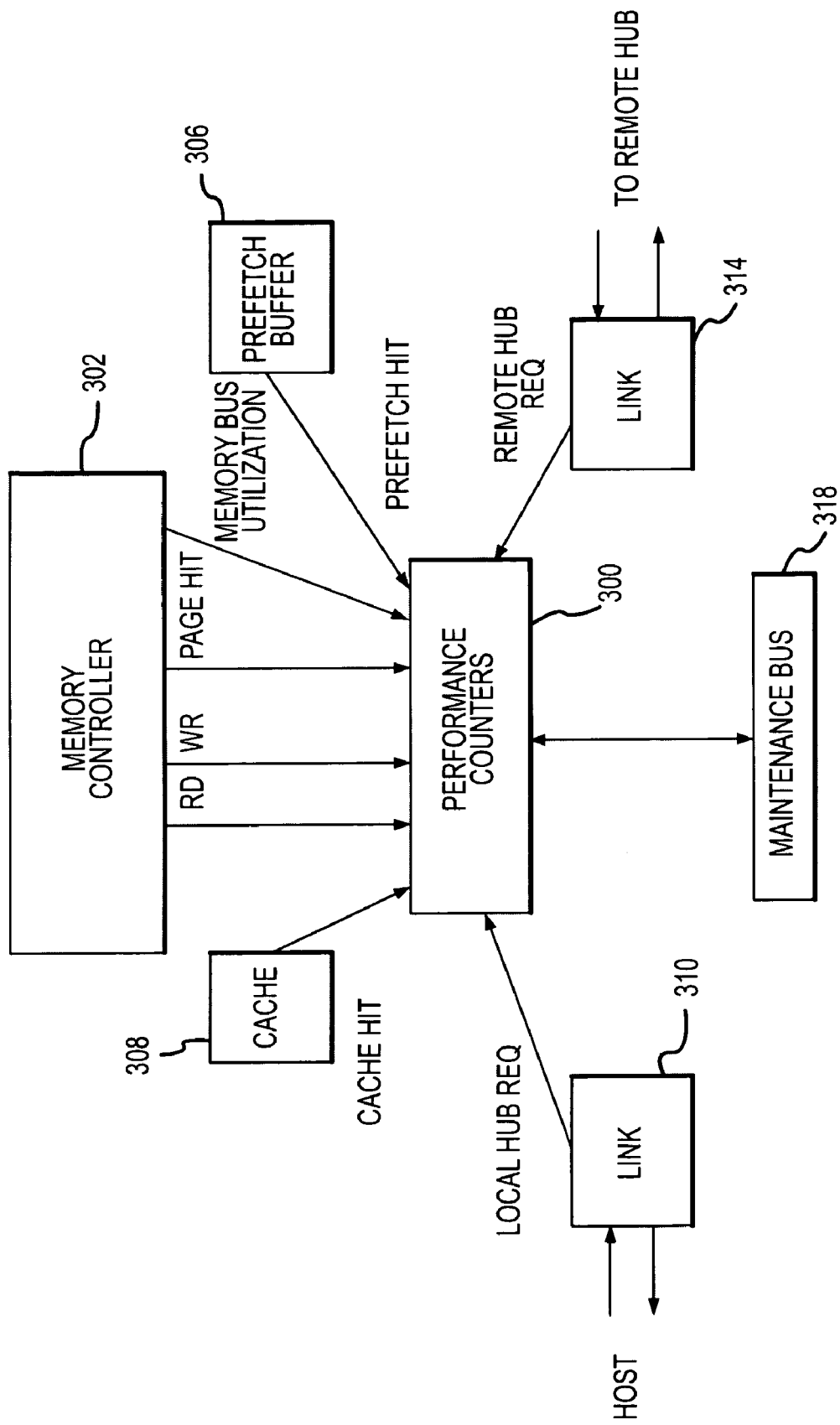
FIG. 3 is a block diagram of a memory hub which contains performance counters according to one example of the invention.

Another embodiment of a portion of a memory hub that obtains performance data is shown in FIG. 3. In the example illustrated in FIG. 3, at least one performance counter 300 is provided in communication with a memory controller 302. The performance counter 300 is further in communication with a prefetch buffer 306, a cache 308, links 310 and 314, and a maintenance bus 318. It is to be understood that in some examples of the invention, the performance counter 300 may not be in communication with one or more of the components shown in FIG. 3. Further, in still other examples one or more performance counters are in communication with other elements of a memory hub not shown in FIG. 3.

The performance counters 300 track one or more metrics associated with memory access and/or performance, including for example, page hit rate, number or percentage of prefetch hits, cache hit rate or percentage, read rate, number of read requests, write rate, number of write requests, rate or percentage of memory bus utilization, local hub request rate or number, and remote hub request rate or number, in one example of the invention. The performance counters 300 also monitors the coupling of memory requests and data through the memory hub to determine how busy the hub is and whether it is coupling memory requests and data efficiently and without excessive delay. It is to be understood that the performance counter 300 could monitor other performance characteristics, depending on the configuration of the memory hub and the components with which the counter is in communication. In either case, the performance counter 300 tracks performance characteristics, and preferably communicates those characteristics from the memory modules 130 so that they can be examined. For example, the data indicative of the performance characteristics can be coupled through the maintenance bus 318. The maintenance bus 318 can provides a user with access to the performance counters 300 to assess the performance of the computer system. For example, performance characteristics can be downloaded to a separate PC host via the maintenance bus 318. Other means of coupling and/or using the performance characteristics will be apparent to one skilled in the art.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A memory module, comprising:
   a plurality of memory devices; and
   a memory hub, comprising:
   a link interface receiving memory requests for access to memory cells in at least one of the memory devices;
   a memory device interface coupled to the memory devices, the memory device interface being operable to transmit memory requests to the memory devices for access to memory cells in at least one of the memory devices and to receive read data responsive to at least some of the memory requests; and
   a performance monitor coupled to the memory device interface, the performance monitor operable to track at least one performance metric related to the performance of the memory hub or the memory devices connected to the hub.

2. The memory module of claim 1 wherein the link interface comprises an optical input/output port.

3. The memory module of claim 1 wherein the memory device interface comprises a memory controller, and the performance monitor is coupled to the memory controller.

4. The memory module of claim 1 wherein the memory device interface comprises a cache, and the performance monitor is coupled to the cache.

5. The memory module of claim 1 wherein the memory hub further comprises a prefetch buffer, and the performance monitor is further coupled to the prefetch buffer.

6. The memory module of claim 1 wherein the memory hub further comprises a maintenance bus, and the performance monitor is further coupled to the maintenance bus.

7. The memory module of claim 1 wherein the performance monitor is further coupled to the link interface.

8. The memory module of claim 1 wherein the performance metric tracked by the performance monitor comprises at least one performance metric selected from the group consisting of page hit rate, number or percentage of prefetch hits, cache hit rate or percentage, read rate, number of read requests, write rate, number of write requests, rate or percentage of memory bus utilization, local hub request rate or number, and remote hub request rate or number.

9. The memory module of claim 1 wherein the memory devices comprise dynamic random access memory devices.

10. The memory module of claim 1 wherein the performance metric tracked by the performance monitor comprises a performance metric related to the transmitting of memory requests and data through the memory hub.

11. A memory hub, comprising:
a link interface receiving memory requests for access to memory cells in at least one of a plurality of memory devices;
a memory device interface coupled to the memory devices, the memory device interface being operable to transmit memory requests to the memory devices for access to memory cells in at least one of the memory devices and to receive read data responsive to at least some of the memory requests; and
a performance monitor coupled to the memory device interface, the performance monitor operable to track at least one performance metric related to the performance of the memory hub or the memory devices connected to the hub.

12. The memory hub of claim 11 wherein the link interface comprises an optical input/output port.

13. The memory hub of claim 11 wherein the memory device interface comprises a memory controller, and the performance monitor is coupled to the memory controller.

14. The memory hub of claim 11 wherein the memory device interface comprises a cache, and the performance monitor is coupled to the cache.

15. The memory hub of claim 11, further comprising a prefetch buffer, and wherein the performance monitor is further coupled to the prefetch buffer.

16. The memory hub of claim 11, further comprising a maintenance bus, and wherein the performance monitor is further coupled to the maintenance bus.

17. The memory hub of claim 11, wherein the performance monitor is further coupled to the link interface.

18. The memory hub of claim 11 wherein the performance metric tracked by the performance monitor comprises at least one performance metric selected from the group consisting of page hit rate, number or percentage of prefetch hits, cache hit rate or percentage, read rate, number of read requests, write rate, number of write requests, rate or percentage of memory bus utilization, local hub request rate or number, and remote hub request rate or number.

19. The memory hub of claim 11 wherein the performance metric tracked by the performance monitor comprises a performance metric related to the transmitting of memory requests and data through the memory hub.

20. The memory hub of claim 11 wherein the memory devices comprise dynamic random access memory devices.

21. A computer system, comprising:
a central processing unit ("CPU");
a system controller coupled to the CPU, the system controller having an input port and an output port;
an input device coupled to the CPU through the system controller;
an output device coupled to the CPU through the system controller;
a storage device coupled to the CPU through the system controller;
a plurality of memory modules, each of the memory modules comprising:
a plurality of memory devices; and
a memory hub, comprising:
a link interface receiving memory requests for access to memory cells in at least one of the memory devices;
a memory device interface coupled to the memory devices, the memory device interface being operable to transmit memory requests to the memory devices for access to memory cells in at least one of the memory devices and to receive read data responsive to at least some of the memory requests; and
a performance monitor coupled to the memory device interface, the performance monitor operable to track at least one performance metric related to the performance of the memory hub or the memory devices connected to the hub.

22. The computer system of claim 21 wherein the link interface comprises an optical input/output port.

23. The computer system of claim 21 wherein the memory device interface comprises a memory controller, and the performance monitor is coupled to the memory controller.

24. The computer system of claim 21 wherein the memory device interface comprises a cache, and the performance monitor is coupled to the cache.

25. The computer system of claim 21 wherein the memory hub further comprises a prefetch buffer, and the performance monitor is further coupled to the prefetch buffer.

26. The computer system of claim 21 wherein the memory hub further comprises a maintenance bus, and the performance monitor is further coupled to the maintenance bus.

27. The computer system of claim 21 wherein the performance monitor is further coupled to the link interface.

28. The computer system of claim 21 wherein the performance metric tracked by the performance monitor comprises at least one performance metric selected from the group consisting of page hit rate, number or percentage of prefetch hits, cache hit rate or percentage, read rate, number of read requests, write rate, number of write requests, rate or percentage of memory bus utilization, local hub request rate or number, and remote hub request rate or number.

29. The computer system of claim 21 wherein the memory devices comprise dynamic random access memory devices.

30. The computer system of claim 21 wherein the performance metric tracked by the performance monitor comprises a performance metric related to the transmitting of memory requests and data through the memory hub.

31. A method of reading data from a memory module, comprising:
receiving memory requests for access to a memory device mounted on the memory module;
transmitting the memory requests to the memory device responsive to the received memory request, at least some of the memory requests being memory requests to read data;
receiving read data responsive to the read memory requests; and tracking with the memory module at least one performance metric of the memory module.

32. The method of claim 31 wherein the act of tracking at least one performance metric comprises tracking at least one performance metric selected from the group consisting of page hit rate, number or percentage of prefetch hits, cache hit rate or percentage, read rate, number of read requests, write rate, number of write requests, rate or percentage of memory bus utilization, local hub request rate or number, and remote hub request rate or number.

* * * * *